May 12, 1970 E. H. STONICH 3,511,267
VALVE ASSEMBLY
Filed Sept. 20, 1967 2 Sheets-Sheet 1
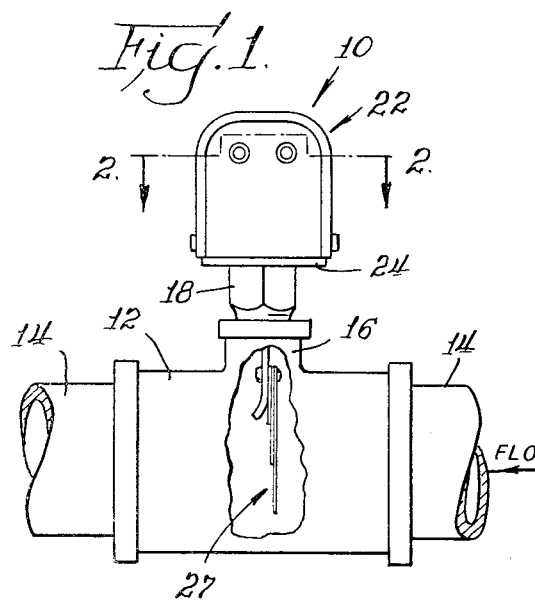
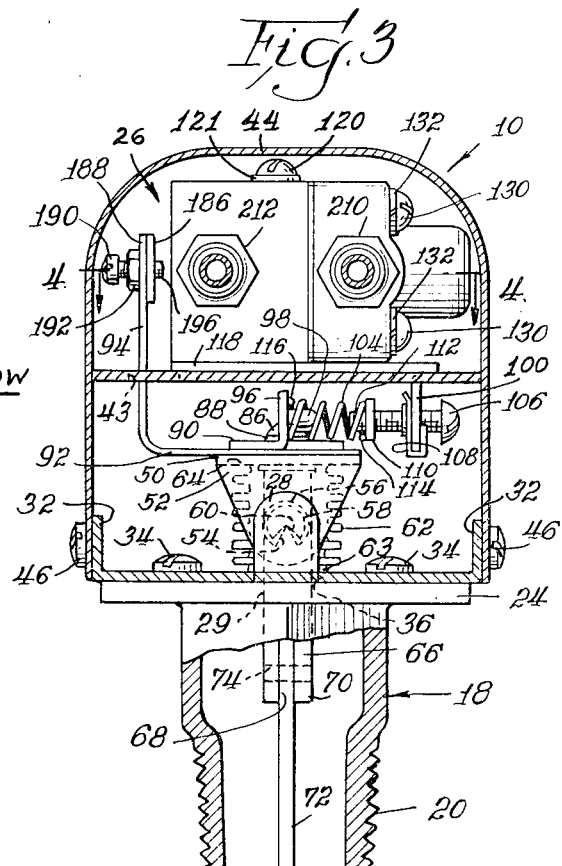
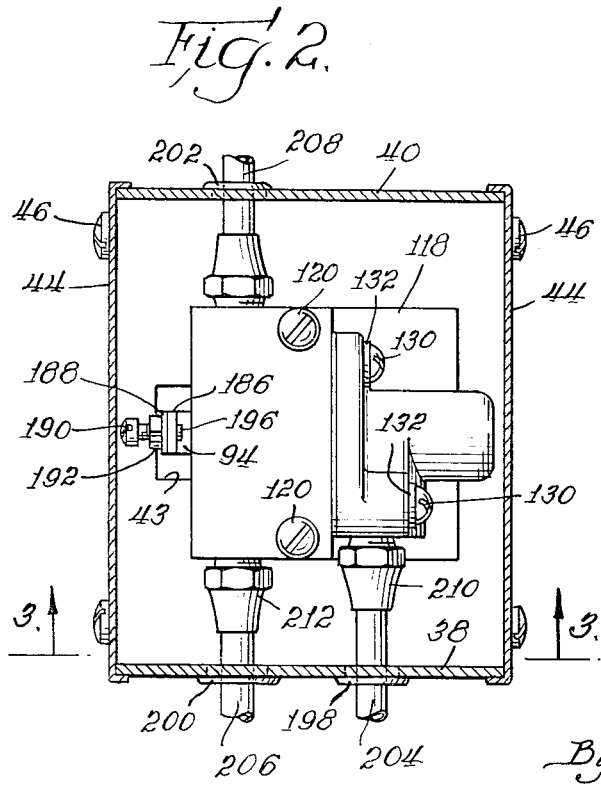
Inventor
Elwood H. Stonich May 12, 1970  E. H. STONICH  3,511,267
VALVE ASSEMBLY
Filed Sept. 20, 1967  2 Sheets-Sheet 2
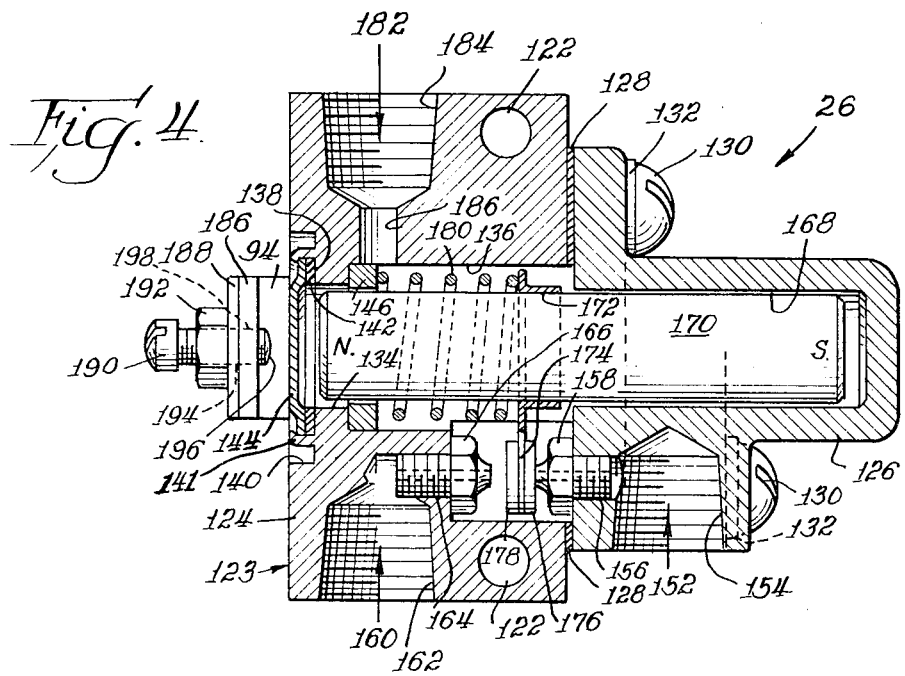
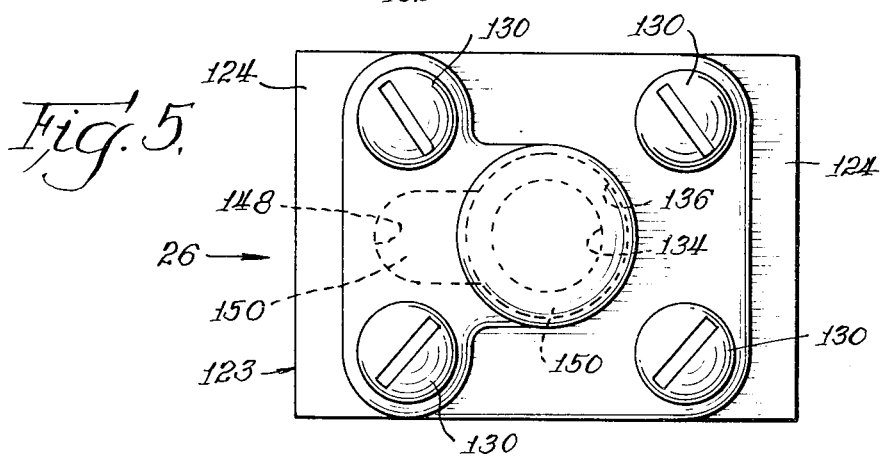
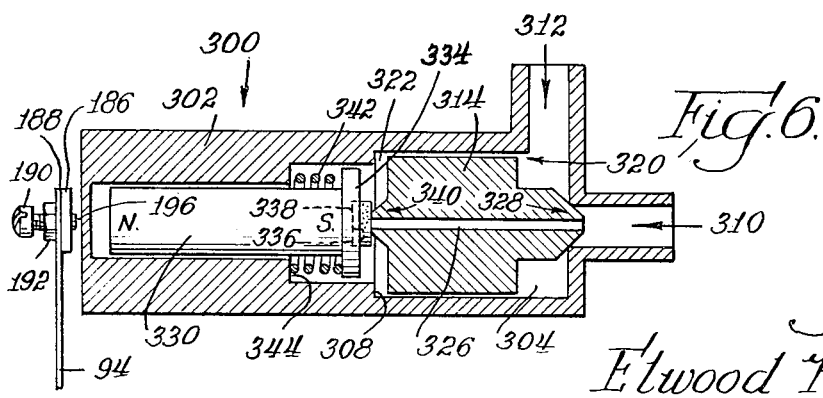
Inventor
Elwood H. Stonich
By Brown Jackson Boettcher & Dienner
Att'ys.

United States Patent Office 3,511,267
Patented May 12, 1970

1

3,511,267
VALVE ASSEMBLY
Elwood H. Stonich, Chicago, Ill., assignor to McDonnell & Miller, Inc., Chicago, Ill., a corporation of Delaware
Filed Sept. 20, 1967, Ser. No. 669,030
Int. Cl. F16k 17/20
U.S. Cl. 137—486   4 Claims

ABSTRACT OF THE DISCLOSURE

A valve assembly comprising a valve, which includes a non-magnetic housing and an inner member which is effective for opening and closing passageway means of the valve upon movement of the inner member within the housing, and means for actuating the valve in response to fluid displacement within a fluid-confining vessel such as a pipeline, which means includes an outer member which is movable external to the housing and means for moving the outer member in response to fluid displacement in the fluid-confining vessel, one of the inner and outer members comprising permanent-magnet means and the other thereof comprising magnetically attractable means.

---

This invention relates to a valve assembly comprising a valve in combination with means for actuating the valve in response to fluid displacement in a fluid-confining vessel.

In the control system of a boiler or similar apparatus in which large volumes of a fluid such as water or steam are employed, it often is desirable to utilize a driving fluid such as air under pressure, which is independent of the fluid which is employed in the boiler or other apparatus, to conduct control signals to a control device from means which is responsive to fluid displacement within a fluid-confining vessel.

The means which is responsive to fluid displacement may comprise a paddle means which is responsive to fluid flow within a pipeline such as may be found in the feedwater system of a boiler, or a float means which is responsive to variations in fluid level within a tank. In whatever form, the means which is responsive to fluid displacement within the vessel should be effective for actuating a valve which intercepts the driving fluid to impart control signals to the driving fluid.

The control device, which is adapted to be actuated by the driving fluid according to the control signals, may comprise a flow valve, such as a feedwater valve for a boiler, or an electrical switch, such as an alarm switch, pump switch, or burner switch for a boiler.

It is one object of this invention to provide an improved valve, which is adapted to control the driving fluid in a control system as mentioned, and which is designed to be actuated in response to fluid displacement within a fluid-confining vessel.

It is another object of this invention to provide a valve assembly comprising a valve of this type in combination with means for actuating the valve in response to fluid displacement within the fluid-confining vessel.

It is another object of this invention to provide an improved valve, which is adapted to control the driving fluid in a control system as mentioned, and which is designed to be actuated in response to fluid flow within a pipeline.

It is another object of this invention to provide a valve assembly comprising a valve of this type in combination with means for actuating the valve in response to fluid flow within the pipeline.

In Kmiecik and Stonich Pat. No. 2,952,753, there is disclosed an improved electrical switch for use with a pipeline adapted to confine a flowing fluid. Suitable paddle means are employed for actuating the switch in response to fluid flow within the pipeline. The switch may be arranged to control pumps, burners, alarms or other devices in which fluid flow within the pipeline is of critical significance.

In Kmiecik Pat. No. 3,126,463, there is disclosed two related types of electrical control devices for use with different types of fluid-confining vessels. For each type of control device, there is provided a suitable means for actuating the electrical control device in response to fluid displacement within the vessel. In one type the vessel is a pipeline adapted to confine a flowing fluid, and suitable paddle means are employed for actuating the electrical control device in response to fluid flow within the pipeline. In the other type, the vessel is a float chamber, and suitable float means are employed for actuating the electrical control device in response to fluid level variations within the float chamber.

It is one feature of this invention that the means which is provided in this invention for actuating the valve in response to fluid displacement within the fluid-confining vessel may comprise means similar to any one of the several means which are disclosed in these two patents for actuating electrical switches or control devices. Accordingly, the means which is provided in this invention for actuating the valve in response to fluid flow within a pipeline may comprise a paddle means which is similar to the paddle means that is disclosed in the patent to Kmiecik and Stonich (2,952,753) for actuating an electrical switch in response to fluid flow within a pipeline; paddle means of this type are specified for the preferred embodiments of this invention to be described hereinafter.

It is another feature of this invention that the actuation of the value is effected by means of magnetic attraction between an inner member which is movable within the valve and which is effective for operating the valve, and an outer member which is external to the valve and which is adapted to be moved by the means for actuating the valve in response to fluid displacement within the fluid-confining vessel. This is superior to a mechanical linkage which would require troublesome fittings that would have to be fluid-tight in order to prevent loss of the driving fluid.

These and other objects, features and advantages of this invention will be evident from the detailed description to follow.

Now, in order to acquaint those skilled in the art with the manner of constructing and utilizing devices embodying the principles of this invention, two preferred embodiments of this invention shall be described with the aid of the annexed drawings, in which:

FIG. 1 is a fragmentary elevational view of the first preferred embodiment of this invention, with portions being broken away to expose certain details;

FIG. 2 is a fragmentary sectional view taken substantially along section line 2—2 of FIG. 1, looking in the direction indicated by the arrows;

FIG. 3 is a sectional view taken substantially along section line 3—3 of FIG. 2, looking in the direction indicated by the arrows;

FIG. 4 is a sectional view taken substantially along section line 4—4 of FIG. 3 looking in the direction indicated by the arrows;

FIG. 5 is an elevational view, looking substantially from the right side of FIG. 4; and FIG. 6 is a diagrammatical view of the second embodiment of this invention, with portions being broken away to expose certain details.

As indicated in FIG. 1, a valve assembly 10, which embodies the principles of this invention, is mounted to a T-fitting 12 which is connected in a pipeline 14. The pipeline 14 is adapted to confine a fluid flowing in the direction indicated by an arrow in FIG. 1. The pipeline 14, which may be part of the feedwater system of a boiler (not shown) is one example of a fluid-confining vessel with which a valve assembly that embodies the principles of this invention may be used.

The T-fitting 12 has a threaded neck 16. The valve assembly 10 comprises a generally tubular base 18 which is threadably mounted in the threaded neck 16 of the T-fitting 12 by means of a threaded end 20, which is indicated in FIG. 3.

As indicated principally in FIGS. 1 through 3, the valve assembly comprises, in addition to the base 18, an under housing 22 which is mounted upon an upper flanged portion 24 of the base 18, a valve 26 which is mounted within the outer housing 22, and a paddle means 27 which is operatively associated with the valve 26 and which is inserted into the T-fitting 12 through the generally tubular base 18 and the neck 16 so as to intercept fluid flowing in the pipeline 14. The valve 26 is characteristic of the first preferred embodiment of this invention.

The base 18 is characterized by a pair of upwardly directed trunnion posts 28 which may be formed in one piece with the flanged portion 24 of the base 18. One of these trunnion posts 26 is illustrated in FIG. 3. The flanged portion 24 is provided with a central opening 29, which is located between the trunnion posts 28, opening into the generally tubular base 18.

The outer housing 22 comprises a generally rectangular bottom wall 30 which is provided with upturned flanges 32 along two of its opposite edges. The bottom wall 30 is fixedly mounted to the flanged portion 24 of the base 18 by means of a plurality of screws 34; it is provided with a pair of slots (not shown) through which the trunnion posts 28 extend, and with a central opening 36 overlying the central opening 29 in the flanged portion 24 of the base 18. The outer housing further comprises a pair of upturned end walls 38 and 40, which may be formed in one piece with the bottom wall 30, and a platform wall 42 extending between the end walls 38 and 40. The platform wall 42 is mounted to these end walls 38 and 40, in any suitable manner, so as to be spaced from and parallel to the bottom wall 30. The platform wall 42 is provided with an enlarged central opening 43. The outer housing 22 further comprises a cover 44 which is adapted to close the outer housing 22; this cover 44 is locked to the flanges 32 by means of a plurality of screws 46.

As indicated in FIG. 3, the paddle means 27 comprises a bracket 48 which has a generally flat platform portion 50 and a pair of downturned end portions 52. One of the end portions 52 is illustrated in FIG. 3. Each end portion 52 is formed with a knife edge 54 extending toward the platform portion 50 into a pin-receiving aperture 56 which is formed in the same end portion 52. To each trunnion post 28 there is fixedly mounted, in any suitable manner, a trunnion pin 58 which has a generally circular cross-section but which is formed with a downwardly opening wedged portion 60. Each trunnion pin 58 is disposed in one of the pin-receiving apertures 56 such that the wedged portion 60 of the same trunnion pin 58 receives the knife edge 54 of the same pin-receiving aperture 56; in this way, the bracket 48 is pivotally mounted upon the knife edges 54.

A resiliently compressible bellows 62, which is open at one end 63 and closed at the other end 64, is sealed in any suitable manner to the underside of the platform portion 50 of the bracket 48 upon its closed end 64, and is sealed similarly to the bottom wall 30 about the central opening 36 therein along its open end 63. This bellows 62 is placed in slight compression when the knife edges 54 engage the wedged portions 60 of the trunnion pins 58; in this way the bracket 48 is supported and held in place for pivotal movement upon the knife edges 54.

The paddle means 27 further comprises a cylindrical retaining member 66, which has a slot 68 formed at one end 70. A paddle arm 72 is inserted into this slot 68, and is locked in place by means of a pin 74. The paddle arm 72 is curved back at the opposite end 76, as shown in FIG. 3. Three paddle leaf members 78, 79 and 80, of increasing depth, are fastened to the paddle arm 72 by means of a screw and nut set 81 and a positioning pin 82; they are arranged on the upstream face 83 of the paddle arm 72 in a cascaded arrangement with the deepest member 80 at the outermost. The provision of multiple paddle leaf members adapts the paddle means 28 to variously sized pipelines, and provides a means for regulating the pivotal action of the paddle means 28 by adding or removing paddle leaf members.

The opposite end 84 of the retaining member 66 is mounted to the underside of the closed end 64 of the bellows 62, and thereby to the bracket 48, by means of a screw 68 which is employed over a seal washer 88, through an upper plate member 90 and a lower plate member 92, through the platform portion 50 of the bracket 48 and the closed end 64 of the bellows 62, and into a suitable threaded receptacle (not shown) in this end 84 of the retaining member 66.

An upturned arm 94, which extends through the enlarged central opening 43 in the platform wall 42, is formed in one piece with the lower plate member 92. The upper plate member 90 is provided with an upturned flange 96. A nut 98 is fixedly mounted, in any suitable manner, to the upturned flange 96. The platform wall 42 is provided with a downturned flange 100, which is formed in continuation of the enlarged central opening 43 in the platform wall 42.

The paddle means 27 is responsive to fluid flow in a direction which is generally normal to the paddle leaf members 78, 79 and 80, that is, from right to left as indicated by an arrow in FIG. 3. An adjustment means 102 is provided for adjusting the reaction of the pivot means 28 to a force trending to pivot the pivot means 28. This adjustment means 102 comprises a coiled spring 104 which is disposed between the flange 96 and the flange 100. An adjustment screw 106 passes through an aperture (not shown) in the flange 100 and threadably engages a sheet metal lock nut 108 which is clamped onto the same flange 100. The screw 106 carries a pilot collar 110 which is locked in place on the screw 106; the lead end 112 of the screw 106 extends beyond the pilot collar 110. One end 114 of the coiled spring 104 is piloted over the lead end 112 of the screw 106 and bears against the pilot collar 110, and the opposite end 116 is piloted over the nub 98 and bears against the flange 96. This adjustment means 02 produces a variation in the compression of the spring 104 which opposes pivotal movement of the paddle means 27 in response to fluid flow, and tends to restore the paddle means 27 to a position at which the arm 94 rests against the edge of the opening 43 in the platform wall 42. The paddle means 27, which is similar to the paddle means disclosed in the patent to Kmiecik and Stonich, 2,952,753, is one example of a valve-actuating means for use in a valve assembly which embodies the principles of this invention.

As indicated in FIG. 3, a plate member 118 bridges the opening 43 in platform wall 42 so as to cover this opening 43 but for clearance for movement of the arm 94 in response to pivoting of the paddle means 27.

As indicated in FIGS. 2 through 5, the valve 26 is mounted upon the plate member 118 and to the platform wall 42 by means of a pair of screws 120, which are employed over lock washer 121 (FIG. 3), through suitable apertures 122 (FIG. 4) in the valve 26, and through suitable apertures (not shown) in the plate member 118, for threaded engagement with the platform wall 42. The valve 26 includes a housing 123, which comprises a first housing member 124 and a second housing member 126 which are mounted together upon an intermediate gasket 128 by means of four screws 130 which are employed over lock washers 132.

The first housing member 124 is provided with a bore 134 which is characterized at its opposite ends by a deep counterbore 136 and a shallow counterbore 138. An annular groove 140, which is coaxial with the shallow counterbore 138, forms an annular ridge 141 which extends between the shallow counterbore 138 and the annular groove 140. An annular gasket 142 is seated in the shallow counterbore 138. A thin-walled cap 144 is mounted in place over the gasket 142 and secured to the annular ridge 141, in any suitable manner, thereby closing the shallow counterbore 138. A guide ring 146, which has an inner diameter not greater than the diameter of the bore 134, is seated in the deep counterbore 136 and is held in place in any suitable manner. The first housing member 124 is provided with a well 148 which is formed parallel to the deep counterbore 136 and which opens laterally into the deep counterbore 136. The well 148 and the deep counterbore 136 generally form a chamber 150 within the housing 123.

A first passageway means 152, which opens into the chamber 150, is formed in the second housing member 126; it comprises a threaded socket 154, and a threaded bore 156 which communicates from the threaded socket 154 to the well 148. A conventional inlet-outlet fluid nipple 158 is threaded into the threaded bore 156 so as to be directed into the well 148. A second passageway means 160, which opens into the chamber 150, is formed in the first housing member 124; it comprises a threaded socket 162, and a threaded bore 164 which communicates from the threaded socket 162 to the well 148. The threaded bore 160 is coaxial with the threaded bore 156. A fluid nipple 166, which is similar to the fluid nipple 158, is threaded into the threaded bore 164, so as to be directed into the well 148 thereby to be opposed to and transversely spaced from the fluid nipple 158.

A cylindrical well 168, which has a diameter approximately equal to the inner diameter of the guide ring 146, is formed in the second housing member 124 so as to be coaxial with the guide ring 146; this well 168 opens into the deep counterbore 136. An elongated permanent-magnet means or bar magnet 170 is slidably mounted within the well 168 and through the guide ring 146. A flanged collar 172 is mounted around and affixed in any suitable manner to the bar magnet 170.

A closure means 173 for the first and second passageway means 152 and 160 comprises a tab 174, which is formed in one piece with the flanged collar 172, extending between the fluid nipple 158 and the fluid nipple 166. The closure means 173 further comprises a first valve element 176 and a second valve element 178, both of which may be formed of a suitable resiliently deformable material such as neoprene. These valve elements 176 and 178 are mounted fixedly to opposite sides of the tab 174 so as to be disposed between the fluid nipples 158 and 166. The bar magnet 170 is slidably movable within the housing 123 between a first position, at which the valve element 176 bears against the fluid nipple 158 and thereby closes the first passageway means 152, and a second position, at which the valve element 178 bears against the fluid nipple 166 and thereby closes the second passageway means 160. At the first position of the bar magnet 170, as shown in FIG. 4, the second passageway means 160 is open; at the second position thereof, the first passageway means 152 is open. A coiled spring 180, which reacts between the guide ring 146 and the flanged collar 172, biases the bar magnet 170 toward its first position.

A third passageway means 182, which opens into the chamber 150, is formed in the first housing member 124; it comprises a threaded socket 184, and a bore 186 which communicates from the threaded socket 184 to the deep counterbore 136.

In order to prevent the bar magnet 170 from binding, certain valve housing parts which may be made of metal including the first and second housing elements 124 and 125, the screws 130, the thin-walled cap 144, the guide ring 146, and the fluid nipples 158 and 166, should be made of a suitable non-magnetic metal such as brass.

As indicated in FIGS. 2 through 4, an armature 186, which is formed of piece of magnetically attractable material—preferably of highly permeable iron, is mounted to and carried by the upper end 188 of the upturned arm 94 by means of a threaded screw 190 which engages an intermediate nut 192 and passes through an aperture 194 in the arm 94. The lead end 196 of the screw 190 extends from a suitably threaded aperture 198 in the armature 186. The nut 192 is back-threaded against the arm 94 so as to secure the armature 186 to the arm 94. Pivoting of the paddle means 27 effects movement of the armature toward and away from the housing 123 so as to move the bar magnet 170, against the bias imposed by the spring 180, by magnetic attraction between the bar magnet 170 within the housing 123 and the armature 186 external to the housing 123.

The lead end 196 of the screw 190 serves as an adjustable stop means for control of the minimum separation of the armature 186 and the thin-walled cap 138 of the housing 123. The interaction of the force of magnetic attraction and the spring-biasing force may be controlled by means of this adjustable stop means. It is preferred that the screw 190 be adjusted so that a minimum separation slidable movement of the bar magnet from its first to its second position is effected, but so that at slightly greater separations the spring 180 restores the bar magnet 170 to its first position; this requires that the spring 180 be properly selected so as to permit such precise control. The edge of the opening 43 in the platform wall 42 serves as a stop means for the arm 94 upon restoration of the paddle means 27 by the adjustment means 102, as described.

As indicated in FIG. 2, a pair of grommets 198 and 200 are mounted in the end wall 38, in any suitable manner, and a grommet 202 is mounted similarly in the end wall 40. A length of conventional tubing 204 is admitted to the outer housing 22 through the grommet 198. A length of similar tubing 206 is admitted to the outer housing 22 through the grommet 200, and a length of similar tubing 208 is admitted to the outer housing 22 through the grommet 202. The admitted end of the tubing 204 is characterized by a conventional threaded fitting 210 which threadably engages the threaded socket 154 so as to connect the tubing 204 to the first passageway means 152 of the valve 26. The admitted end of the tubing 206 is characterized by a similar fitting 212 which threadably engages the threaded socket 162 so as to connect the tubing 206 to the second passageway means 160. And the admitted end of the tubing 206 is characterized by a similar fitting 214 which threadably engages the threaded socket 184 so as to connect the tubing 208 to the third passageway means 182.

At this point it may be understood that the valve 26 is susceptible of at least two different but related applications. It should be understood that the driving fluid, upon which the valve 26 acts, is independent of the fluid in the pipeline, which acts upon the paddle means 27.

Thus, in one application, the third passageway means 182 is connected through the tubing 208 to a suitably adapted control device (not shown), which may be a valve or a switch as mentioned. The second passageway means 160 is connected through the tubing 206 to a source (not shown) of a driving fluid under pressure, which preferably is air under pressure. And the first passageway means 152 is connected through the tubing 204 to a reservoir (not shown) for the driving fluid; if air is used as the driving fluid, the reservoir may be the atmosphere. In this instance, when the valve 26 is unactuated, the bar magnet 170 is disposed in its first position with the result that the first passageway means 152 is closed and the second passageway means 160 is open; thus the driving fluid is admitted to the control device through the valve 26. But, upon actuation of the valve 26, the bar magnet 170 is moved from its first to its second position with the result that the first passageway means 152 is opened and the second passageway means 160 is closed; thus, the driving fluid passing to the control device is cut off by the valve 26 and the driving fluid is bled off from the control device to the reservoir through the valve 26.

In another application, the connections of the first passageway means 152 and the second passageway means 160 are interchanged. As in the first instance, when the valve 266 is unactuated, the bar magnet 170 is disposed in its first position with the result that the first passageway means 152 is closed and the second passageway means 160 is open; thus, the driving fluid is blocked from the control device by the valve 26 and the driving fluid is bled off from the control device to the reservoir through the valve 26. But, upon actuation of the valve 26, the bar magnet 170 is moved from its first to its second position with the result that the first passageway means 152 is opened and the second passageway means 160 is closed; thus, the driving fluid is admitted to the control device through the valve 26.

As a modification (not shown) of the first embodiment of this invention, it is contemplated to provide a plurality of passageway means similar to the third passageway means 182 in order that parallel control devices may be controlled by the valve 26. Equivalently, branched tubing may be provided in place of the tubing 208 which opens into the third passageway means 182. In these instances, passageway means or tubing which is superfluous in a given application may be plugged by conventional means.

The valve 300, which is diagrammatically shown in FIG. 6, is characteristic of the second preferred embodiment of this invention. The valve 300 is meant to be substituted, in the valve assembly 10 of the preceding figures, in place of the valve 26; therefore, elements which are common to FIG. 6 and to the preceding figures bear similar reference numbers in FIG. 6 and in the preceding figures. In view of the foregoing detailed description of the first preferred embodiment of this invention, the following diagrammatic description of the second embodiment of this inventnion should suffice.

As indicated in FIG. 6, the valve 300 comprises a non-magnetic generally cylindrical housing 302, which is provided with a cylindrical chamber 304. A cylindrical well 306, which is coaxial with the chamber 304, is formed in the housing 302 so as to open into the chamber 304. An annular shoulder 308 thus is provided around the well 306. A first passageway means 310, which coaxially opens into the chamber 304, and a second passageway means 312, which laterally opens into the chamber 304, are provided in the housing 302.

A cylindrical piston means 314, which has a lateral surface 316, is slidably mounted within the chamber 304, which has a lateral surface 318, such that the lateral surface 316 of the piston means 314 generally slidably engages the lateral surface 318 of the chamber 304 but for a limited lateral clearance 320 between these lateral surfaces 316 and 318 for passage of driving fluid. The piston means 314 thereby divides the chamber 304 into a back portion 322 in back of the piston means 314 and a front portion 324 in front of the piston means. The first and second passageway means 310 and 312 communicate with the front portion 324 of the chamber 304. The piston means 314 is provided with a bore 326 which communicates from the back portion 322 to the front portion 324 of the chamber 304. The bore 326 has a cross-sectional area which is greater than the cross-sectional area of the lateral clearance 320 between the lateral surface 316 of the piston means 314 and the lateral surface 318 of the chamber 304.

The front end 328 of the piston means 314 is adapted to close the first passageway means 310 but for the bore 326 when the piston means 314 is disposed in a closing position, as shown.

An elongated permanent-magnet means, or bar magnet 330 is slidably mounted within the well 306. One end 332 of the bar magnet 330 extends into the back portion 322 of the chamber 304 and is characterized by an enlarged cylindrical boss 334 which is provided with a coaxial recessed seat 336. A valve element 338 is seated within the seat 336. This valve element 338 is adapted to close the bore 326 when the valve element 338 engages the back end 340 of the piston means 314.

A coiled spring 342, which is employed around a portion of the bar magnet 330 reacts between a central recess 344 in the shoulder 308 and the boss 334 so as to bias the bar magnet 330 towards the piston means 314.

The armature 186, which is indicated in FIG. 6, has been described with reference to the first preferred embodiment of this invention. Movement of the armature 186 toward and away from the housing 302 moves the bar magnet 330 against the bias imposed by the spring 342, by magnetic attraction between the bar magnet 330 within the housing 302 and the armature 186 external to the housing 302.

In operation, the second passageway means 312 is connected to a source (not shown) of driving fluid under pressure, and the first passageway means 310 is connected to a suitably adapted control device (not shown), which may be a valve or a switch. When the valve 300 is unactuated, the piston means 314 is in its closing position at which its front end 328 closes the first passageway means 310 but for the bore 326, and the bar magnet 330 is in a first position at which the valve element 338 closes the bore 326 at the back end 340 of the piston means 314. The bar magnet 330 and the piston means 314 are held in place by the force imposed by the spring 342. Driving fluid is present at equal pressures in the back portion 322 and in the front portion 324 of the chamber 304, because of driving fluid passing through the lateral clearance 320. The bar magnet is movable from its first position to a second position deep within the well 306. When the bar magnet 330 is moved to its second position upon actuation of the valve 300, an initial separation of the valve element 338 and the back end 340 of the piston means 314 allows the back portion 322 of the chamber 304 to be depressurized through the open bore 326 at a greater rate than it can be repressurized through the lateral clearance 320. This depressurization allows the driving fluid in the front portion 324 of the chamber 304 to displace the piston means 314 back into the chamber 304 until the piston means 338 engages the shoulder 308. During displacement of the piston means 314, the back portion 322 of the chamber 314 will be repressurized through the bore 326 and through the lateral clearance 320. Upon reengagement of the valve member 338 and the back end 340 of the piston means 314, equal pressure in the front portion 324 and in the back portion 322 of the chamber 304 will be maintained through the lateral clearance 320. Because of this equal pressure when the piston means 314 has been displaced fully back into the chamber 304, the magnetic attraction needs to overcome only the force imposed by the spring 342 in order to retain the bar magnet 330 in its second position deep within the well 306. Removal of the armature 186 allows the spring 342 to restore the valve 300; repressurization of the back portion 322 of the chamber 304 takes place simultaneously with movement of the bar magnet 330 back to its first position, the bar magnet 330 simultaneously pushing the piston means 314 back to its closing position.

Certain modifications (not shown) are contemplated, which may apply to either preferred embodiments of this invention. One such modification comprises providing a permanent magnet in place of the armature 186. Another such modification comprises providing a magnetically attractable armature in place of the bar magnet 170 or 330 and a permanent magnet in place of the armature 186.

It is thought that other modifications and improvements to the subject matter of this invention will be suggested by this disclosure to those skilled in the art. For example, means other than the described paddle means may be provided for actuating the valve. In this light, the scope of this invention should be determined by the following claims.

I claim:

1. A valve assembly, for use with a vessel which is adapted to confine a fluid, comprising a non-magnetic housing which is provided with a chamber and with first and second passageway means opening into said chamber, an inner member which is mounted within said housing for movement between a first and a second portion and which is biased toward its first position, closure means for closing said first passageway means when said inner member is disposed in its first position and for opening said first passageway means when said inner member is moved from its first to its second position, and means for effecting movement of said inner member from its first to its second position, which means comprises an outer member which is movable external to said housing and means for moving said outer member toward and away from said housing in response to fluid displacement within the vessel, one of said outer and inner members comprising permanent-magnet means and the other comprising magnetically attractable means, said inner member being movable from its first to its second position by magnetic attraction between said inner and outer members upon movement of said outer member toward said housing, wherein said closure means is effective for closing said second passageway means when said inner member is disposed in its second position and for opening said second passageway means when said inner member is moved from its second to its first position, said housing being provided with a third passageway means opening into said chamber.

2. The valve assembly of claim 1, wherein said means for moving said outer member comprises paddle means responsive to fluid displacement within said vessel.

3. The valve assembly of claim 1, wherein said closure means comprises a first and a second valve element which are mounted to and carried by said inne member, said first valve element being effective for closing said first passageway means when said inner member is disposed in its first position, said second valve element being effective for closing said second passageway means when said inner member is disposed in its second position.

4. The valve assembly of claim 1, wherein said means for moving said outer member comprises paddle means responsive to fluid displacement within said vessel.

References Cited

UNITED STATES PATENTS

| | | | |
|---|---|---|---|
| 2,251,441 | 8/1941 | Dillman | 251—30 XR |
| 2,842,150 | 7/1958 | Olson | 251—65 XR |
| 2,952,753 | 9/1960 | Kmiecik et al. | 200—81.9 |
| 3,070,344 | 12/1962 | Tausch | 251—65 |
| 3,126,463 | 3/1964 | Kmiecik | 200—81.9 |
| 3,224,727 | 12/1965 | Dale et al. | 251—65 |

M. CARY NELSON, Primary Examiner

R. J. MILLER, Assistant Examiner

U.S. Cl. X.R.

137—625.64; 251—65